Figure 1:
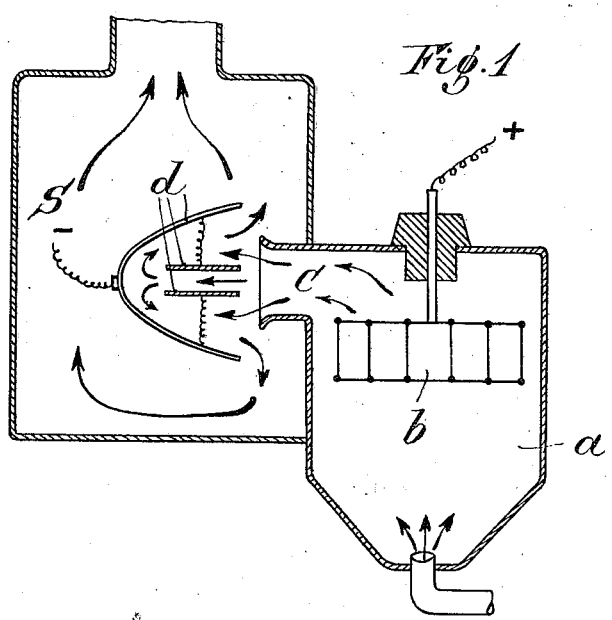

G. KRAUSE.
PURIFICATION OF GASES.
APPLICATION FILED NOV. 24, 1913. RENEWED OCT. 22, 1920.

1,377,205.

Patented May 10, 1921.

Witnesses:—

Inventor
Georg Krause

UNITED STATES PATENT OFFICE.

GEORG KRAUSE, OF MUNICH, GERMANY.

PURIFICATION OF GASES.

1,377,205.

Specification of Letters Patent.

Patented May 10, 1921.

Application filed November 24, 1913, Serial No. 802,701. Renewed October 22, 1920. Serial No. 418,775.

*To all whom it may concern:*

Be it known that I, GEORG KRAUSE, a subject of the German Emperor, residing at Munich, in Germany, have invented certain new and useful Improvements Relating to the Purification of Gases, of which the following is a specification.

The invention relates to the purification of gases by charging them with electricity. It is known to purify gases by electrically charging same and thereby precipitating the matter to be separated, and further to effect such charging and precipitation in two separate electric fields.

In the known apparatus for carrying out this process the electrodes at the points of charging and precipitation are of opposite polarity, the result being that said electrodes have to be spaced comparatively far apart in order to prevent electric compensation by direct sparking. This arrangement only allows of a small part of the area for the passage of the gas to be utilized for the action of the electrodes, so that a considerable amount of impure matter passes through the apparatus without being electrically charged and precipitated, and the apparatus is consequently inefficient.

This disadvantage is avoided in the process according to the present invention by using electrodes of like polarity at the charging point, and also electrodes of like polarity at the precipitation point, so that the area for the passage of the gas can be fully utilized for the effective action of the electrodes without danger of electric compensation due to direct sparking across same.

The electrodes at the charging point are of a different polarity from those at the precipitation point, so that a field is formed between the two sets of electrodes.

A further feature of the invention is that the velocity of the gases is lower at the points where charging and precipitation occurs than during their passage from the charging point to the precipitation point. The rapid passage of the charged particles to the precipitating chamber prevents weakening of the charge, while sufficient time is allowed for the charging and precipitation of the gases.

Another novel feature of the invention resides in the arrangement and construction of the charging electrodes with a view to the most efficient utilization of the area for the passage of the gas, said electrodes being preferably arranged parallel to the direction of the flow of gas and the other set of electrodes being preferably perpendicular to the current of gas, and said electrodes consisting preferably of wires.

During the course of operation of the apparatus, the precipitating electrodes are likely to become fouled or covered with the separated solid matter. When the electrodes are in this condition they are practically inoperative for the desired purpose, and clean electrodes must be substituted. In order that such substitution may be effected without stoppage of operation, I may form the precipitating electrodes as oppositely extending units, pivotally mounted, so that either unit may be swung into operative position, when the other unit requires cleaning. In this form of the device, only the electrode unit in operative position need be charged with current.

Two embodiments of the invention are shown in the accompanying drawings, in which:—

Figure 2:
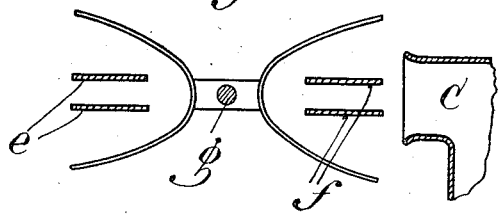

Figure 1 is a diagrammatic longitudinal section of one form of construction, and Fig. 2 is a diagrammatic cross section of a double precipitating electrode system.

$a$ is the charging chamber, in which the charging electrodes $b$ are disposed, $c$ is the inlet passage to the collecting chamber $s$, in which latter are disposed the precipitating electrodes $d$, which have to be passed by the particles moving in the direction indicated by the arrows. The cross-section of said chambers is greater than that of said inlet passage. Fig. 2 shows a double precipitating electrode system $e$ $f$ which is pivoted at $g$, so that either of the electrode systems, which are insulated from each other, can be brought in front of the inlet passage $c$ to the aforesaid collecting chamber.

What I claim as my invention and desire to secure by Letters Patent of the United States is:—

Apparatus for purifying gas, comprising a charging chamber and a precipitating chamber with a passage of restricted area therebetween, a plurality of electrodes of like polarity arranged in said charging chamber in the path of the gases adapted to flow therethrough, and a plurality of electrodes of like polarity arranged in said precipitating chamber in the path of the gases adapted to flow thereinto through said passage from said charging chamber, the electrodes in one of said chambers being of a different polarity with respect to the electrodes in the other of said chambers.

In witness whereof I have signed this specification in the presence of two witnesses.

GEORG KRAUSE.

Witnesses:
A. W. W. COTTER,
RICHARD LEMP.